(12) United States Patent
Eijkelenberg et al.

(10) Patent No.: US 7,017,767 B2
(45) Date of Patent: Mar. 28, 2006

(54) NON-FRAGMENTING PRESSURE RELIEF APPARATUS

(75) Inventors: Tom Eijkelenberg, Westerlo (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 10/712,179

(22) Filed: Nov. 13, 2003

(65) Prior Publication Data

US 2005/0103785 A1     May 19, 2005

(51) Int. Cl.
    *B65D 90/36*     (2006.01)
(52) U.S. Cl. .................................. 220/89.2; 137/68.19
(58) Field of Classification Search ............... 220/89.2, 220/203.18; 137/68.19–68.28
    See application file for complete search history.

(56) References Cited

U.S. PATENT DOCUMENTS

| | | |
|---|---|---|
| 3,526,336 A | 9/1970 | Wood |
| 4,067,154 A | 1/1978 | Fike, Jr. |
| 4,404,982 A | 9/1983 | Ou |
| 4,512,171 A | 4/1985 | Mozley |
| 4,512,491 A * | 4/1985 | DeGood et al. ........... 220/89.2 |
| 4,662,126 A | 5/1987 | Malcolm |
| 4,669,626 A | 6/1987 | Mozley |
| 4,759,460 A | 7/1988 | Mozley |
| 4,777,974 A | 10/1988 | Swift et al. |
| 4,821,909 A | 4/1989 | Hibler et al. |
| 5,036,632 A | 8/1991 | Short, III et al. |
| 5,154,202 A * | 10/1992 | Hibler et al. ............ 137/68.27 |
| 5,267,666 A | 12/1993 | Hinrichs et al. |
| 5,305,775 A | 4/1994 | Farwell |
| 5,467,886 A | 11/1995 | Hinrichs |
| 6,070,365 A | 6/2000 | Leonard |
| 6,494,074 B1 | 12/2002 | Cullinane et al. |
| 6,540,029 B1 | 4/2003 | Snoeys et al. |
| 2004/0189020 A1* | 9/2004 | Krebill et al. |

FOREIGN PATENT DOCUMENTS

FR              957849        12/1947

* cited by examiner

*Primary Examiner*—Lien M. Ngo
(74) *Attorney, Agent, or Firm*—Hovey Williams LLP (57) ABSTRACT

Non-fragmenting pressure relief apparatus includes at least one circular rupture disc having a central asymmetric bulged section and a peripheral flange portion. A semi-circular line of weakness extends around the periphery of the bulged section and presents a hinge portion between the ends of the line of weakness. A hold-down member for the rupture disc having an inner opening surrounding the bulged section of the disc is provided with a unitary segment that extends into the inner opening of the hold-down member. The spaced end extremities of the line of weakness extend beneath the hold-down member segment. The hinge portion of the disc upon rupture of the disc bends about a fulcrum defined by the outer margin of the hold-down segment, which in conjunction with deflection of the segment of the hold-down member contributes to anti-fragmentation of the disc.

18 Claims, 5 Drawing Sheets

NON-FRAGMENTING PRESSURE RELIEF APPARATUS

BACKGROUND OF THE INVENTION

1. Field of the Invention

This invention relates to non-fragmenting, forward-acting pressure relief apparatus used to protect processing equipment, pressure vessels, piping and structures from high pressure events and/or to vent such equipment when destructive and catastrophic overpressures result from any media where an explosion is a risk such as gas and dust particle explosions. Explosion hazards exist in connection with various types of gases and dust particles such as coal, flour, sugar, metal, and plastics. In particular, the invention concerns a single pressure relief rupture disc and composite rupture disc apparatus designed to rupture and vent a protected area, process or equipment whenever an overpressure condition occurs that exceeds a preselected value. The pressure relief rupture disc apparatus incorporates a rupture disc or rupture disc assembly which ruptures and vents an area when overpressure condition or explosion occurs wherein the section of the rupture disc or sections of the rupture disc assembly open fully for pressure relief without fragmentation or separation of the ruptured sections of the disc or composite sections of the disc assembly from the remaining flange portion or portions of the assembly.

The non-fragmenting pressure relief apparatus is adapted for use in a variety of applications including those where cycling between positive and negative pressure in the protected system must be accommodated without rupturing of the disc or disc assembly and opening of the rupturable section of the disc or the rupturable sections of the disc assembly occurs only when a predetermined pressure value is exceeded in the protected zone.

2. Description of the Prior Art

Many industrial processes involve handling and processing of materials that under certain conditions can create hazardous overpressures resulting from explosive conflagrations, or rapid rise in pressure from runaway processes, failure of protective devices such as pressure regulating valves, and similar unpredictable mishaps. Exemplary in this respect are processes involving gases or dust particles in contained vessels or piping which can spontaneously ignite or produce an explosion from untoward events such as a spark or the like and that result in dangerous pressure build-ups within an enclosure, piping or containment vessels. Single rupture discs and composite rupture discs usually having two separate rupture discs have long been employed to protect vessels, pipes, conduits, and structures or areas from overpressure of a predetermined value.

Explosion vents have been provided for many years to cover relief openings in vessels, tanks, bag houses, and piping associated with such equipment, to relieve excess pressure before the excessive pressure damages equipment, components, or structures where the equipment is in operation. Bag houses or the like that are constantly at risk of explosions by virtue of the high concentration of dust within the bag house. Typically bag houses are constructed with one or more pressure relief openings having explosion vents closing each relief opening. The explosion vents seal the openings when the bag houses operate at normal positive or negative pressures and then burst or open when the bag houses are subjected to a pressure build up of a predetermined excess magnitude to uncover the openings and thus vent the interior of the bag houses. To prevent premature or a late bursting, explosion vents must be designed to consistently burst at a particular pressure level. The same type of hazard must also be safely controlled in connection with processing equipment involving combustible gases or dust particles, pipes conveying gases or dust laden fluids from one part of a process to another or to a collection area, processing vessels in which a runaway reaction or untoward build-up of pressure in the vessel can occur without warning, and other industrial processes where an uncontrolled explosion or excessive build-up of pressure is a continuing safety hazard.

Pressure relief apparatus also must accommodate cycling between positive and negative pressure conditions in the equipment, piping, or vessels that require overpressure protection. To this end, it has been conventional to provide rupture disc apparatus in which a rupturable section of the apparatus includes a central bulged area presenting opposed convex concavo surfaces with the concave surface facing the protected zone. This forward acting bulge rupture disc is better able to withstand vacuum conditions within the protected zone than is the case with a flat rupture disc. In addition, pressure relief rupture disc assemblies have included a pair of rupturable central areas with one of the rupture discs being of thicker material than the other rupture disc. In the case of bulged rupture discs, the concavo-convex areas of the discs are in complemental aligned relationship.

Many of the pressure relief devices in the past and present use have been provided with lines of weakness defining the rupturable section of both flat and bulged discs. The lines of weakness are semi-circular in the case of circular discs and rectangular in the instance of rectangular rupture discs. The lines of weakness have been either score lines in one surface of a respective disc defining the rupture area thereof, or a series of elongated slits extending through the rupture disc material with unitary disc webs separating the ends of adjacent elongated slits. Where slits through the disc material are provided defining lines of weakness, a layer of rupturable material, usually a flexible synthetic resin film or the like, is positioned in overlying relationship to the series of slits in order to prevent leakage of fluid therethrough until such time as rupture of the section of the disc defined by the line of weakness occurs. Exemplary pressure relief rupture disc structures in this respect have been provided with two rupture discs in complemental overlying relationship with a layer of flexible material interposed between adjacent surfaces of the rupture discs and an additional strip of flexible material directly overlying a corresponding line of weakness.

The lines of weakness, whether in the form of a score line, or a series of elongated slits defining a line of weakness, do not extend around the entire perimeter of the rupture portion of the disc defined by the line of weakness, but have opposed ends in spaced relationship which present a unitary hinge for the rupturable section of the disc to retain the ruptured portion of the disc with the flange portion thereof, and thereby avoid fragmentation of the disc with attendant released metal fragment hazards in the area surrounding the location of the pressure relief apparatus.

Notwithstanding the provision of anti-fragmentation hinge portions of the rupture discs structures of previous designs, the construction of such hinge areas has not been totally satisfactory to accommodate a multiplicity of overpressure events and conditions. If the width of the hinge area is too great, the pressure value at which the rupturable section gives way is often times compromised resulting in failure of the rupture disc to open at a pre-selected value. On the other hand, if the hinge area is narrowed in order to assure full opening of a rupture disc at a prescribed pressure value, the unitary hinge area tends to also rupture allowing the section of the disc which opens to tear away from the surrounding remaining flange portion of the disc and thereby produce a resultant dangerous metal projectile escaping from the rupture disc assembly at high velocity.

Therefore, there has been and continues to be a need for pressure relief rupture disc apparatus which will reliably open at a preset overpressure value yet is resistant to fragmentation of the ruptured area of the disc upon opening of the disc. It is also desirable that the design of the explosion protection rupture disc assembly be applicable to a wide range of vent openings and different prescribed rupture pressures dependent solely upon materials of construction, thickness of the material and whether the central section is bulged or not, without it being necessary to provide a multiplicity of specifically engineered hinge construction designs in order to prevent fragmentation of the rupturable section of the disc.

SUMMARY OF THE INVENTION

Non-fragmenting, forward-acting pressure relief apparatus in accordance with this invention includes either a single rupture disc, or a pair of rupture discs, each having a central section and a peripheral flange section. The apparatus is adapted to be clamped between annular inlet and outlet support members in certain high pressure applications. A line of weakness that extends around a central part of the central section of each of the discs defines the rupturable portion of that disc. The line of weakness has opposed end regions in spaced relationship presenting a unitary hinge portion therebetween that prevents the central section of each disc from tearing away from the peripheral flange section of a respective disc upon rupture of the central section thereof. Each line of weakness in a preferred form of the invention comprises a line of elongated, end-to-end, spaced slits having terminal ends which define the hinge portion of the disc.

A hold-down member is provided for the rupture disc in a single disc embodiment and for both discs in a composite rupture disc assembly. The hold-down member has an inner opening in generally circumscribing relationship to the rupturable central section of the adjacent disc in close proximity to the line of weakness in the disc. The hold-down member has an elongated unitary segment that extends into the inner opening of the hold-down member in disposition engaging the hinge portion of the adjacent disc and overlying respective opposed end regions of the line of weakness. The unitary segment of the hold-down member overlying the hinge portion of the rupture disc has an innermost margin extending between opposed end regions of the line of weakness in inwardly spaced relationship from respective outermost ends of the line of weakness.

Upon application of a force against the central rupturable section of a single disc or the rupturable sections of a pair of complemental discs sufficient to tear the unitary webs of disc material between adjacent ends of the slits defining the line of weakness, the rupturable sections of the discs open to vent the area protected by the pressure relief apparatus. Although the line of weakness tears along the full length thereof upon rupture of the central section of a respective disc, the hinge portion of the central section of the disc bends along the outer margin of the inwardly extending segment of the hold-down member, rather than about an imaginary line extending between the outermost opposed, spaced extremities of the line of weakness. The hinge portions of the discs therefore bend along a line of greater length than the distance between the opposed outermost extremities of corresponding lines of weakness. The outer margin of the inwardly extending segment of the hold-down member functions as an elongated fulcrum edge for the hinge portion of the disc or discs to more evenly distribute the bending forces on the hinge portion of the disc across an area spaced inwardly from the narrowest zone of the hinge portions of the central sections of the disc. In addition, a transverse portion of the inwardly extending segment of the hold-down member extending in a direction away from the outer margin of that segment is deflected by the hinge portion of the central section of the discs during rupture of the central sections of the disc or discs along substantially the full length of the line of weakness. The deflected transverse portion of the segment of the hold-down member absorbs a part of the rupture force applied to the central section of the disc or discs thus diverting part of the force away from the hinge portions extending between respective outermost ends of the lines of weakness. As the transverse portion of the segment of the hold-down member is deflected by the hinge portions of the central section or sections of the disc or discs during rupture of the central sections thereof, the deflected portion of the segment of the hold-down member is bent into a transversely inclined or generally curved configuration along a substantial portion of the length of the hold-down member segment. Deflection of the transverse portion of the hold-down member segment contributes to prevention of separation of the central section of the disc or discs from the peripheral flange portions thereof at the hinge portion of the disc during rupture of the disc, by virtue of the fact that the hinge portion of the disc or discs bend around an inclined or curved surface defined by the deflected transverse portion of the segment of the hold-down member, rather than bending around an abrupt corner that could contribute to tearing of the hinge portions of the disc along a straight line defined by that corner.

In accordance with a preferred embodiment of the present invention, the pressure relief apparatus is provided with a pair of centrally bulged discs in overlying relationship each of which has a line of weakness defined by a series of end to end spaced slits, with one of the discs being of greater thickness than the other disc. The lines of weakness in opposed discs are in aligned relationship. A hold-down member is provided in overlying relationship to the normally uppermost or outermost disc of the assembly while a support ring is optionally located against the inner or inboard surface of the other rupture disc. The hold-down member and the ring each have an inwardly extending, unitary segment located in aligned relationship to the hinge portion of each of the discs. The inwardly extending segment of the hold-down member against the upper or outermost disc protects against fragmentation of the hinge portions of both of the discs upon forward opening of the discs by an overpressure condition, while the segment of the support ring underlying the innermost rupture disc of the assembly assists in presenting fragmentation of the central rupturable sections of the discs when a vacuum condition prevails of sufficient magnitude to cause inward rupture of the central rupturable sections of the two discs.

It is of importance to note that the line of weakness in each of the rupture discs in the case of a pair of superimposed rupture discs, or where only a single rupture disc is provided, is oriented relatively and of a length such that outermost end regions of the line of weakness in each of the discs extend inwardly in spaced relationship from the outermost margin of the inwardly extending segment of a respective hold-down member. Upon rupture of a central section of the disc or discs along a line defined by the line of weakness of a corresponding disc, the central section will rupture along the entire length of a respective line of weakness, but the hinge portions of the discs bend around the inner elongated margin of the inwardly extending segment of the hold-down member thus protecting the hinge portions from tearing, which would result in separation of the central sections of the discs from the flange portion thereof.

DETAILED DESCRIPTION OF THE PREFERRED EMBODIMENTS

Figure 6:
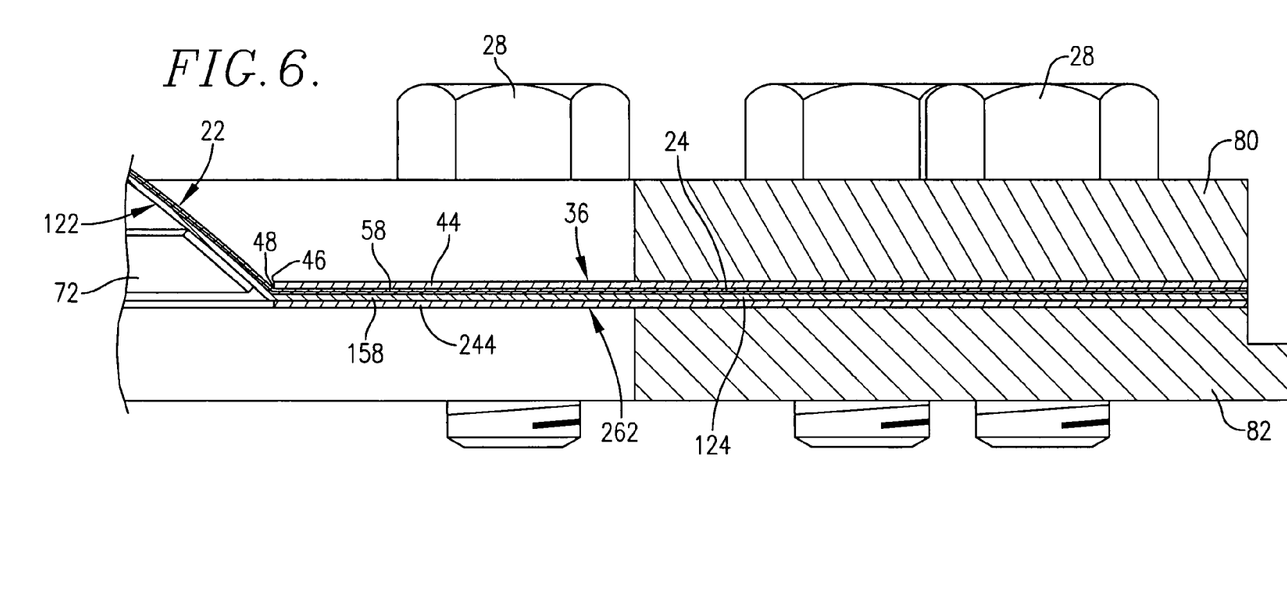
FIG. 6 is an enlarged fragmentary cross-sectional view taken substantially on the line 6—6 of FIG. 2, and in addition showing an annular hold-down member overlying the upper bulged disc, a vacuum support ring against the concave face of the bottom disc, and a support ring underlying the bottom bulged disc.
Figure 7:
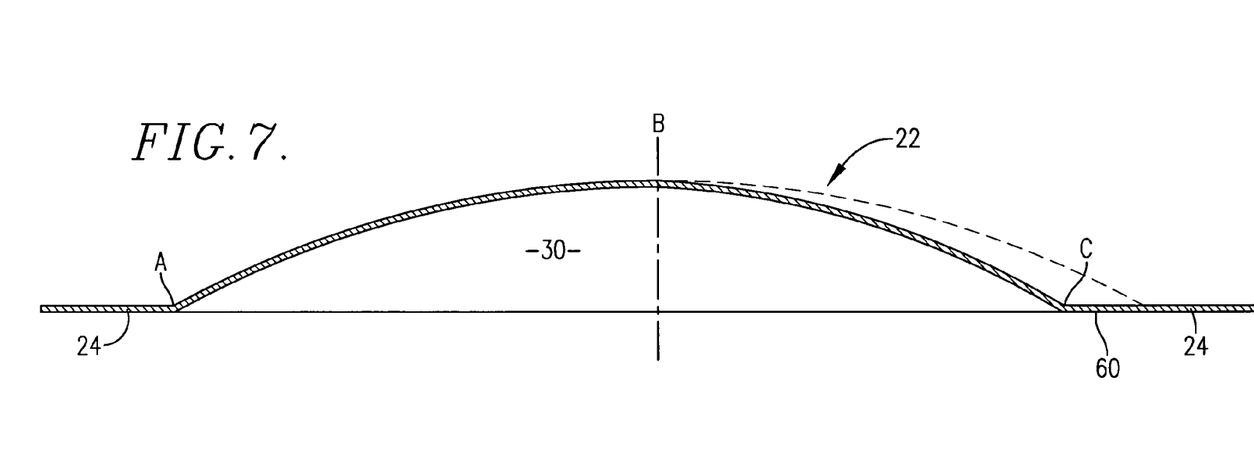
FIG. 7 is a schematic cross-sectional view through one of the bulged rupture discs in illustrating the asymmetric configuration of the bulged area of the disc.

Non-fragmenting, forward-acting composite pressure relief apparatus in accordance with a preferred embodiment of this invention as shown in FIGS. 1–11 of the drawings and generally designated 20. Pressure relief apparatus 20 is optionally adapted to be clamped between conventional inlet and outlet support members 80 and 82 as shown in FIG. 6. Apparatus 20 is especially useful for protecting processing equipment, pressure vessels, piping and structures including bag houses and the like from overpressures resulting from explosions and other potentially destructive and catastrophic high pressure events. Although apparatus 20 as illustrated in the drawings is of circular configuration, the principals hereof are also applicable to rectangular non-fragmenting pressure relief apparatus.

Composite pressure relief apparatus 20 includes a topmost or outermost rupture disc 22 normally constructed of a relatively thin corrosion resistant metal material such as stainless steel. Disc 22 in its circular embodiment includes an annular flange 24 generally provided with a series of circumferentially extending, spaced openings 26 oriented to receive respective bolts 28 (FIG. 6) which serve to optionally clamp apparatus 20 between inlet and outlet support members 80 and 82 forming a part of or connected to structure or equipment to be protected from an untoward overpressure event or condition such as an explosion. Support members such as 80 and 82 are not a requirement in certain overpressure protection applications of apparatus 20.

Figure 10:
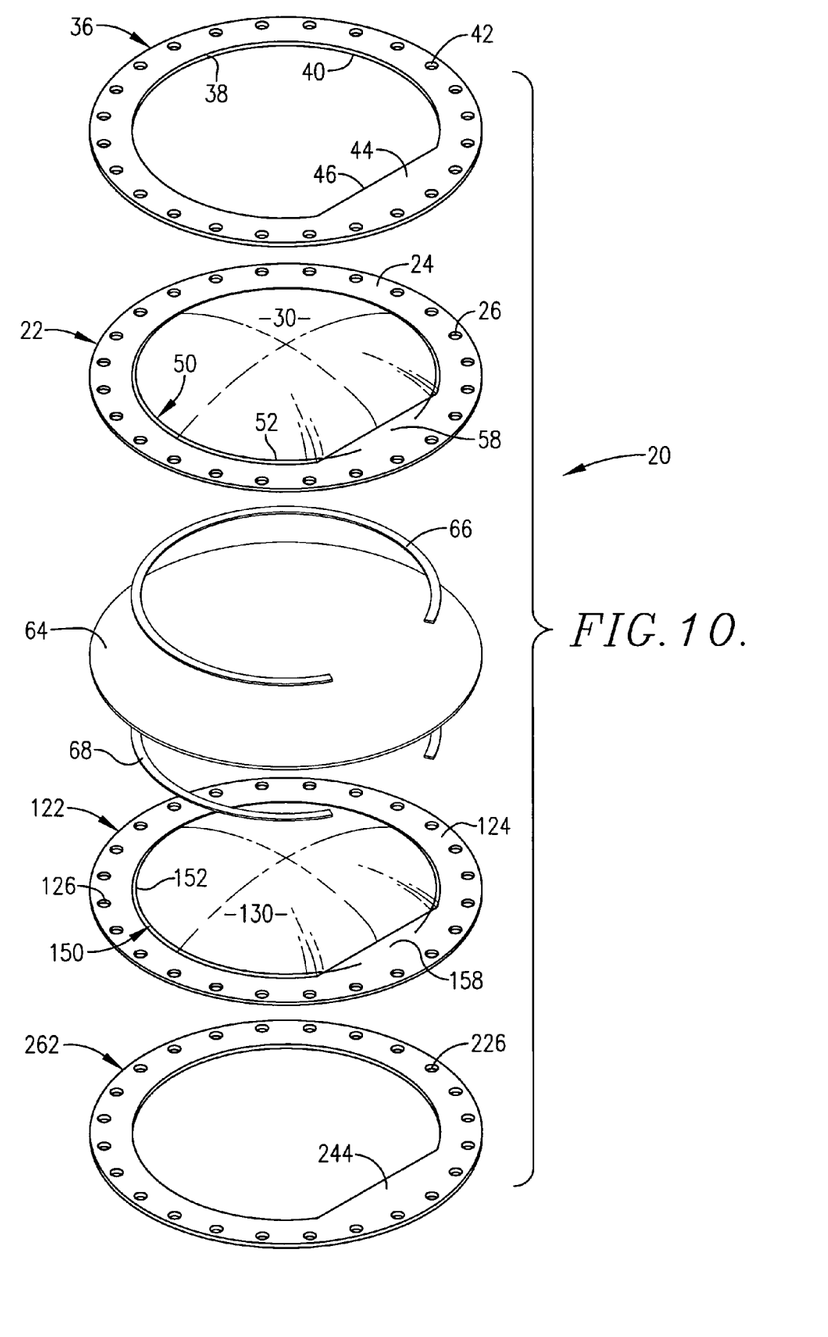
FIG. 10 is an exploded perspective view of the embodiment of the invention having bulged rupture discs.

An annular, generally planar hold-down member 36 that overlies disc 22 and that is best shown in FIG. 10 has an inner, semi-circular edge 38 defining an interior opening 40 of member 36. A series of peripherally positioned bolt receiving openings 42 are provided in hold-down member 36, which correspond to and are aligned with openings 26 in flange 24 of rupture disc 22. A unitary, initially planar segment 44 of hold-down member 36 projects into the opening 40 of hold-down member 36 and has an elongated, rectilinear margin 46 that extends between and merges with opposed end extremities of inner semi-circular edge 38 of hold-down member 36. It is to be seen from FIG. 10 for example, that the length of margin 46 of hold-down member 36 is somewhat (e.g. about 55%–60%) greater than the radius of central section 30 of disc 22.

The bulged portion of central section 30 lies within opening 40 of hold-down member 36 when the latter is positioned in overlying relationship to flange 24 of rupture disc 22. The transition zone 48 between flange 24 of rupture disc 22 and the bulged portion of central section 30 of disc 22 is located just inside of the semi-circular edge 38 of hold-down member 36 when hold-down member 36 is positioned against and in overlying relationship to a bulged disc 22. The bulged portion of central section 30 of disc 22 is formed by bulging the disc in a tool (not shown) that has an inner opening generally conforming to the configuration of edge 38 and margin 46 of hold-down member 36. Accordingly, the bulge formed in the central section 30 of disc 22 is of asymmetric configuration as illustrated schematically in FIG. 7.

The bulged portion of central section 30 of disc 22 is provided with a semi-circular line of weakness generally designated 50 and preferably comprised of a series of arcuate, separate, end-to-end slits 52 each of which extends through the full thickness of the bulged portion of central section 30 of disc 22. As depicted schematically in the fragmentary enlarged view of FIG. 5, each of the slits 52 terminates in a circular opening 54 communicating with a corresponding slit 52 and of substantially greater diameter than the width of each slit 52. Adjacent openings 54 are in spaced relationship presenting a web of material 56 unitary with the material of the bulged portion 30b of section 30. It can be seen from FIG. 4, that the line of weakness 50 in the bulged portion of section 30 of disc 22 defined by slits 52 is of a length such that the endmost slits 52a and 52b of line of weakness 50 define end regions that are in spaced relationship from one another but extend beneath segment 44 of hold-down member 36 overlying the bulged portion of section 30 disc 22. The spaced terminal ends 52c and 52d of end slits 52a and 52b define a unitary hinge portion 58 of central section 30 of bulged disc 22. The margin 46 of segment 44 is located inwardly from an imaginary line between the respective outermost extremities 52c and 52d of line of weakness 52 and therefore the outer extremities of margin 46 intersect end slits 52a and 52b adjacent the innermost ends of end slits 52a and 52b. The distance from an imaginary line between the extremities 52c and 52d of line of weakness 52 and the mid-point of margin 46 of segment 44 measured along the dashed section line 6—6 of FIG. 2 for example is approximately one third of the distance from margin 46 to the outer peripheral edge of disc 22 measured along section line 6—6. Thus, the major depth of segment 46 is approximately one third of the width of the flange 24 of disc 22.

The bulged portion of section 30 of disc 22 is formed by bulging a blank disc into the cavity of a tool having an inner margin that conforms to the configuration of the inner circular edge 38 of the opening 40 in hold-down member 36. Accordingly, the bulged portions of the central section 30 of disc 22 is of asymmetric cross-sectional configuration with the curvature of the bulge opposite hinge portion 58 being of greater curvature than the portion of the bulge which merges into hinge portion 58. The asymmetric cross-sectional shape of the bulged portion of section 30 is illustrated in the cross-sectional view of FIG. 7 wherein it can be seen that the cross-sectional curvature of the bulged section 30 is of greater curvature from outer point A at flange 24 to central point B, than from point B to point C, which represents the area of bulged section 30 contacting the central part of margin 46 of segment 44 of hold-down member 36. Accordingly, disc 22 has a relatively flat portion 60 which conforms generally to the overall shape of segment 44 of hold-down member 36.

As is best shown in the exploded view of FIG. 10, apparatus 20 includes a second rupture disc 122 which is of identical shape and overall dimensions disc 22, but preferably is constructed of somewhat thicker stainless steel material. Furthermore, an annular clamping member 262 is provided against the underside or innermost side of disc 122. The bulged portion of the central section 130 of disc 122 has a line of weakness 50, which preferably has the same number of slits 152 as slits 52 of weakness 50 of disc 22. Furthermore, the slits 152 of line of weakness 150 of disc 122 align with and are of same length as respective slits 52 of line of weakness 50 in rupture disc 22.

A layer 64 of synthetic material such as Teflon or Mylar is interposed between disc 22 and disc 122 for blocking leakage of air or other fluids through the slits of lines of weakness 52 and 152 and each of the discs 22 and 122. Desirably, relatively narrow semi-circular strips 66 and 68 of synthetic resin material such as Teflon are positioned between layer 64 and disc 22 and disc 122 respectively in alignment with respective lines of weakness 50 and 50'. Strips 66 and 68 may be adhesively secured to respective opposed surfaces of central sections 30 and 130 of rupture discs 22 and 122.

It is to be noted from FIG. 10 that the flange 124 of disc 122 has a series of bolt receiving openings 126 that align with openings 26 in disc 22 and with openings 42 in hold-down member 36. Disc 122 has a hinge portion 158 that is of the same dimensions and is aligned with hinge 58 of disc 22.

An annular support ring 262 underlies disc 122 and is of the same shape and configuration as hold-down member 36, but may be the same or of greater thickness. The segment 244 of support ring 262 is aligned with and conforms to the shape of segment 44 of hold-down member 36. Bolt receiving holes in support ring 262 align with openings 42, 26 and 126.

When assembled, hold-down member 36 rests against rupture disc 22 with segment 44 resting on and in complemental engagement with the flat area of disc 22 inboard of flange 24 of the disc. Strips 66 and 68 along with flexible layer 64 close the slits 52 and 152 of each of the bulged portions of central sections 30 and 130 of rupture discs 22 and 122.

The bulged portion of the central section 130 of rupture disc 122 rests within the bulged portion of central section 30 of rupture disc 22 and respective concave and convex faces thereof are separated only by Teflon layer 64 and strips 66 and 68.

Figures 1, 4, 5:
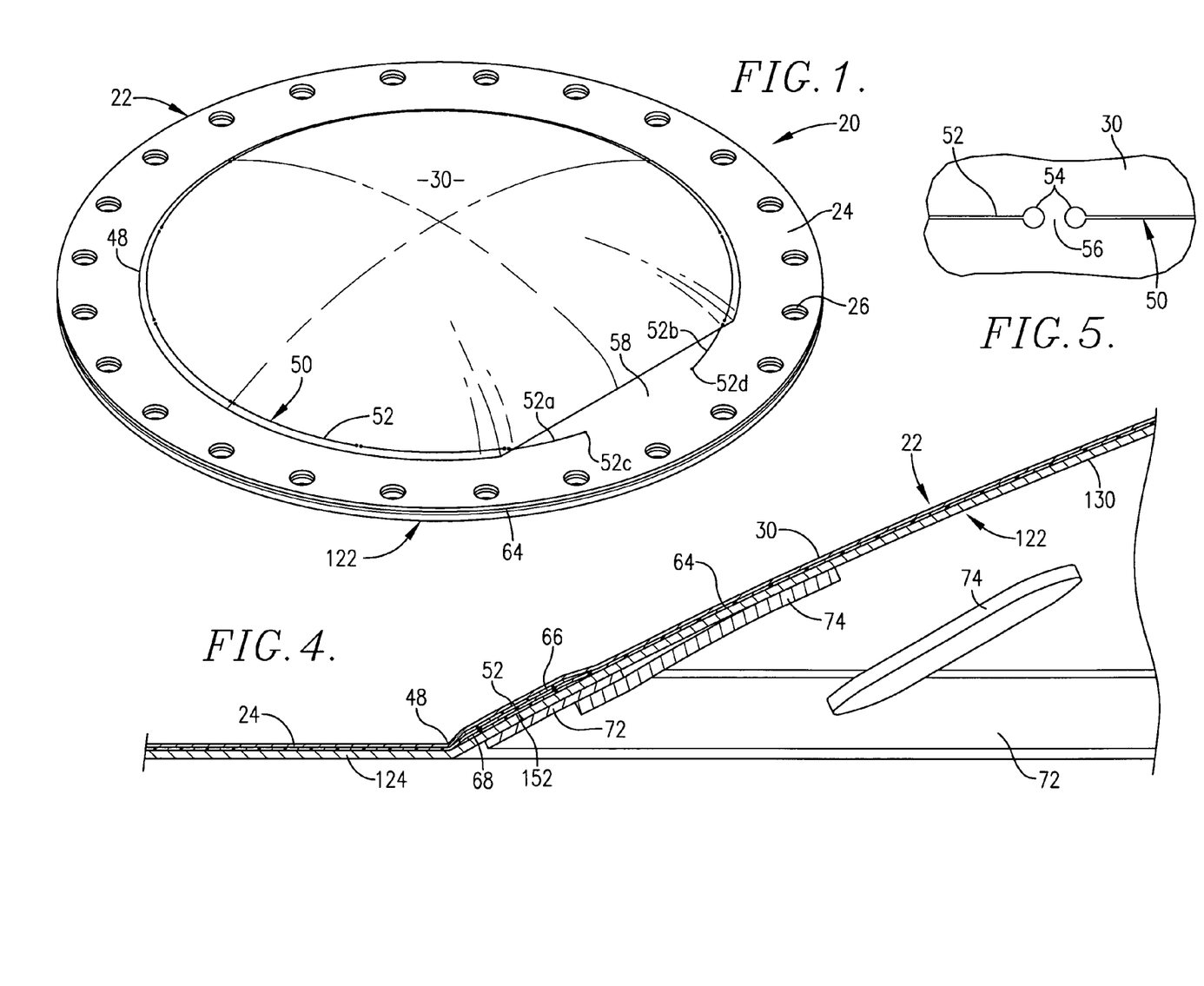
FIG. 1 is a perspective view of composite domed disc structure having a pair of centrally bulged rupture discs forming a part of the non-fragmenting, forward-acting pressure relief apparatus of this invention, with each of the rupture discs being provided with a slit defining line of weakness.
FIG. 4 is an enlarged fragmentary horizontal cross-sectional view taken substantially on the line 4—4 in FIG. 2 and looking in the direction of the arrows.
FIG. 5 is an enlarged fragmentary plan view of opposed ends of slits defining a line of weakness and illustrating circular cutouts at the end of each slit.
Figure 2:
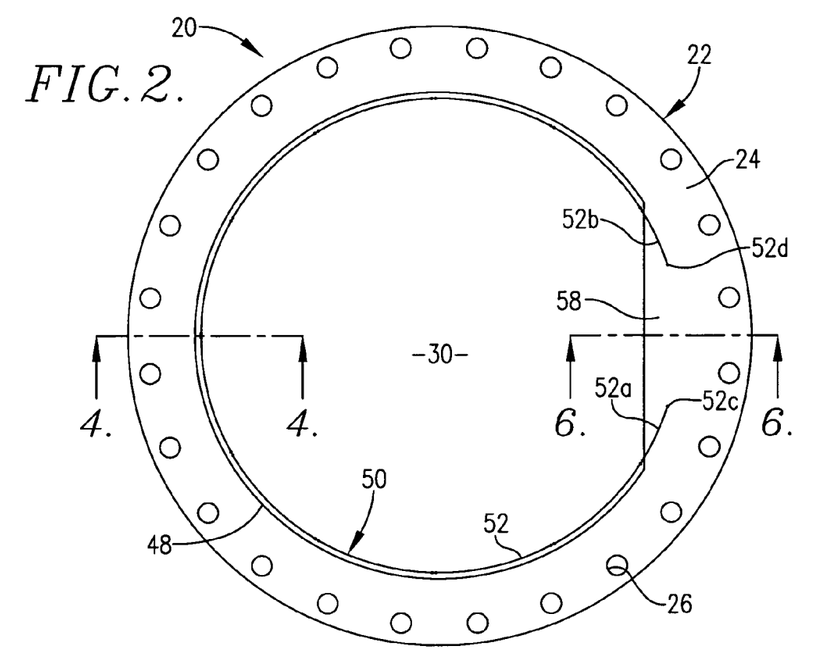
FIG. 2 is a top plan view of the composite disc structure as shown in FIG. 1.
Figure 3:
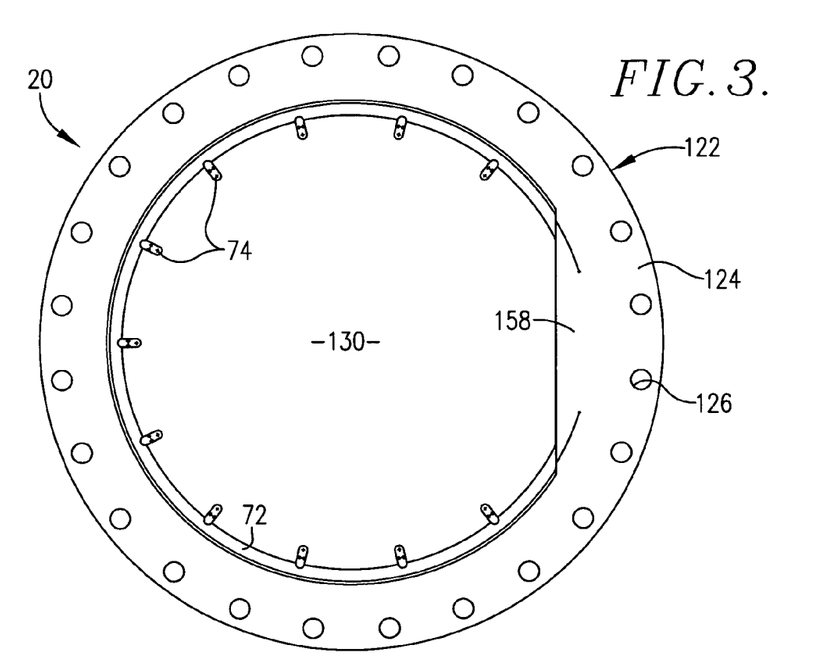
FIG. 3 is a bottom view of the composite disc structure as shown in FIG. 1.

It is desirable, but not mandatory in the case of the preferred embodiments of non-fragmenting pressure relief apparatus 20, that a semi-circular vacuum support ring 72 as shown in FIG. 4, be provided in underlying relationship to the rupture disc 122 in alignment with slits 152 of line of weakness 150 of rupture disc 122. The opposed, spaced ends of ring 72 clear and do not overly the hinge portion of bulged portion of the section 130 of rupture disc 122. Ring 72 is preferably spot welded to the underside of the bulged portion of central section and segment 130 of rupture disc 122. The semi-circular support ring 72 forming a part of apparatus 20 may be formed by bulging a blank disc and then cutting ring 72 from such disc with a laser beam or the like. Optionally, a series of spaced, radially extending tabs 74 may be spot welded to ring 72 on the underside of bulged portion of the central section 30 of rupture disc 122 in partially supporting relationship, to thereby increase the reversal resistance of bulged portions of central sections 30 and 130 of rupture discs 22 and 122 under vacuum conditions imposed on apparatus 20.

Figures 8, 9, 11, 12:
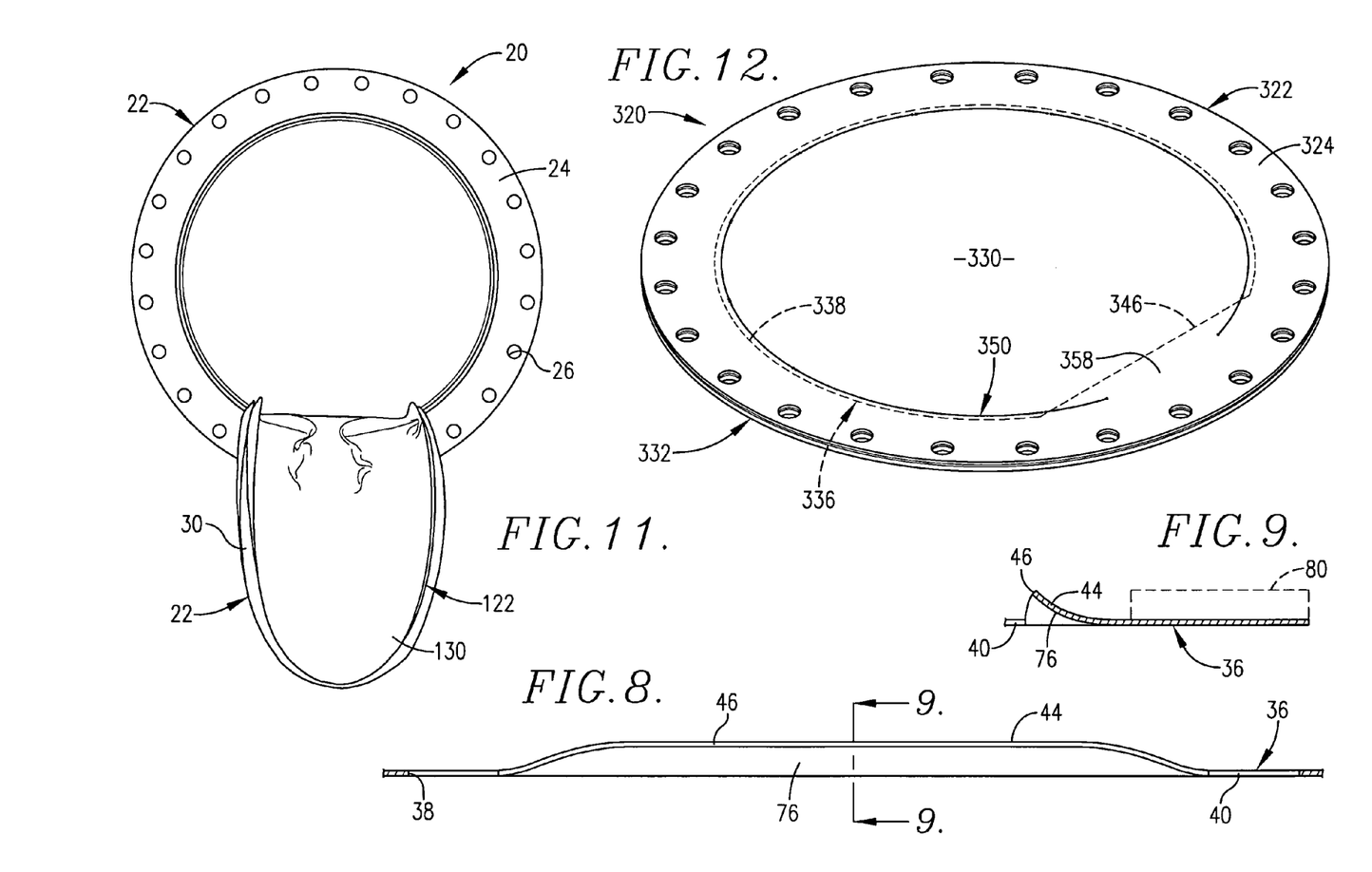
FIG. 8 is an enlarged essentially schematic representation of the segment of the annular hold-down ring which extends into the center of the ring and showing the manner in which the outermost margin of the segment is deflected and bent upwardly by the hinge portion of the rupture disc during rupture thereof.
FIG. 9 is an enlarged schematic cross-sectional view taken on the line 9—9 of FIG. 8 and looking in the direction of the arrows.
FIG. 11 is a top plan view of the rupture disc assembly of FIG. 1 and showing the general shape of the opened ruptured bulged sections of the disc upon actuation of the pressure relief apparatus.
FIG. 12 is a perspective view of alternate non-fragmenting pressure relief apparatus having an essentially flat rupture disc, with the opening in the hold-down ring indicated by dashed lines.

The composite non-fragmenting pressure relief apparatus 320 as illustrated in FIG. 12 is the same as apparatus 20 except that the rupture discs 322 and 332 are flat, do not have central bulged sections, and are each provided with a semi-circular circumferentially extending line of weakness 350. Otherwise, the components of apparatus 320 are the same as the components of apparatus 20. Accordingly, an annular hold-down member 336 designated by dashed lines, and that is identical to hold-down member 36, overlies the central flat section 330 of rupture disc 322. The annular hold-down member (not shown) that overlies the peripheral flange portion 324 of disc 322 has an inner opening 338 shown by dashed lines as well as an inwardly extending segment similar to segment 44 of hold-down member 36 and thus presents an inner straight margin indicated schematically by the dashed line 346 aligned with the hinge portion 358 of disc 322. A support ring identical in configuration to support ring 262 may be provided if desired in underlying relationship of the flange portion of disc 332. The support ring beneath disc 332, if provided, preferably has a segment that conforms to segment 244 of hold-down member 262.

Although composite explosion protection apparatus 20 and 220 having a pair of superimposed complemental rupture discs is preferred for most applications, a single scored bulged rupture disc or a single scored flat rupture disc may be provided if deemed to be adequate for protecting a particular piece of equipment, piping, conduits, or structures from an overpressure condition or an explosion.

In operation, the assembled components of pressure relief apparatus 20 are mounted over a vent opening in structure or equipment requiring protection from explosions or untoward overpressure events with bolts 28 serving to fixedly secure apparatus 20 between optional flanges 80 and 82 in position over the exhaust opening. In the event of an overpressure event developing that exceeds the burst pressure of the central section 30 of rupture disc 22 and central section 130 of rupture disc 122 as controlled by the resistance to rupture of webs 66 between adjacent lines of weakness slits 52 and 152, and the layer 64 of synthetic resin material as well as strips 66 and 68, the central sections 30 and 130 of rupture discs 22 and 122 open instantaneously and bend about respective hinges 58 and 158.

As shown schematically in FIG. 11, the central section 30 of rupture disc 22 and central section 130 of rupture disc 122 open as a unit as the lines of weakness 50 and 150 tear along the full length thereof including the endmost regions thereof defined by terminal end slits 52a and 52b, as well as the corresponding endmost region slits of line of weakness 150 of rupture 122, thus allowing full, unimpeded opening of the central section 30 of rupture disc 22, and central section 130 of rupture disc 122. However, notwithstanding full tearing of the arcuate length of each of the lines of weakness 50 and 150 of central sections 30 and 130 of rupture discs 22 and 122, the hinge portions 58 and 158 of central sections 30 and 130 respectively of rupture discs 22 and 122 bend about a fulcrum presented by the margin 36 of segment 44 of hold-down member 36, and not about an imaginary line in the zone extending between the terminal ends 52c and 52d of lines of weakness 50 and 150.

During rapid full opening of the central sections 30 and 130 of rupture discs 22 and 122 as a result of a high pressure event such as an explosion, the force of gases from the explosion or high pressure event applied to the concave face of disc 122 and transferred to the concave face of disc 22, also is applied to hinge portions 58 and 158 of rupture discs 22 and 122. When the force applied to central sections 30 and 130 of rupture discs 22 and 122 as well as to the hinge portions 58 and 158 of sections 30 and 130 of disc 22 and 122 is of sufficient magnitude to effect opening of central sections 30 and 130, that force has also been found great enough to deflect the outer part of segment 46 to a degree that is generally proportional to the amount of disc breaking force applied to the central sections 30 and 130 of rupture discs 22 and 122, as shown schematically in FIGS. 8 and 9. Referring to the schematic representation of deflected segment 44 in FIG. 8, the transverse deflected portion of the segment 44 of hold-down member 36 extends across substantially the full width of margin 46 of segment 44. The degree to which the segment 44 is deflected is generally proportional to the force applied thereto by central section 30 of disc 22 during opening of the central section 30, with the disc engaging surface 76 of the deflected portion of segment 44 being either somewhat arcuate as shown in FIG. 9, or presenting a somewhat more transversely linear inclined surface.

In all instances though, the deflected outer portion of segment 44 of hold-down member 36 resulting from opening of central sections 30 and 130 of rupture discs 22 and 122 absorbs a part of the rupture force applied to the central sections 30 and 130 of rupture discs 22 and 122, thus diverting that part of the rupture force away from the zone of the hinge portions 58 and 158 extending between respective outermost ends 52c and 52d of lines of weakness 50 and 150. This diversion of a part of the rupture force applied to the central sections 30 and 130 of rupture discs 22 and 122 contributes to prevention of separation of central sections 30 and 130 of rupture discs 22 and 122 from flange portions 24 and 124 thereof during opening of the rupture discs. Another important factor serving to prevent fragmentation of central sections 30 and 130 from flange portions 24 and 124 of rupture discs 22 and 122 results from bending of hinge portions 58 and 158 about the fulcrum defined by margin 46 of segment 44 in spaced relationship from the weakest zone of the hinge portions 58 and 158 extending along an imaginary line between the end extremities 52c and 52d of lines of weakness 50 and 150. In addition, the inclined or curved surface 76 of the deflected part of segment 44 created during deflection of the outer portion of segment 44 and which directly engages hinge portion 58 of central section 30 of disc 22, assures that the hinge portion 58 and 158, as bend about margin 46 of the deflected part of segment 44 are not required to bend about an abrupt transverse edge which could contribute to fragmentation of the central sections 30 and 130 of rupture discs 22 and 122 during opening of the central sections 30 and 130.

As shown schematically in FIG. 11, the central sections 30 and 130 of rupture discs 22 and 122 upon opening lay back in a position generally parallel to their initial closed positions to provide a maximum outlet for escape of gases, but without separating from the flange portions of respective rupture discs. Extension of the lines of weakness 50 and 150 beneath segment 44 of hold-down member 36 has been found to significantly contribute to the non-fragmenting characteristics of central sections 30 and 130 of rupture discs 22 and 122, in that there is no tendency for the hinge portions of central sections 30 and 130 of rupture discs 22 and 122 to commence tearing laterally along the length of margin 46 of segment 44 of hold-down member 36 as the hinge portions 58 and 158 bend about margin 46, rather than being required to bend along an imaginary line between the end extremities 52c and 52d of lines of weakness 50 and 150 that could result in separation of central sections 30 and 130 from flange portions 24 and 124.

Vent apparatus 320 operates in the same manner as vent apparatus 20, except in most instances, the central sections of rupture discs 322 and 332 having flat central sections are not capable of withstanding as high vacuum conditions as is the case with bulged central section rupture discs 22 and 122.

Preferred embodiments of apparatus 20 or 320 may be from about 250 mm in width to as much as about 1500 mm, and be constructed to burst at anywhere from about 25 millibars to about 1 bar. For example, in the case of apparatus 20 or 320 having an overall diameter of about 1015 mm, the diameter of the line of weakness of the central section thereof may nominally be about 775 to 780 mm. The diameter of the bulged section in this instance may be about 797 mm. The rupture discs 22 and 322 are preferably fabricated of 0.5 mm stainless steel, and may be from about 0.15 mm to about 1.5 mm in thickness. The discs 122 and 332 are preferably constructed of 1.2 mm stainless steel and maybe from about 0.8 mm to about 2 mm thick. The Teflon layer 64 and Teflon strips 66 and 68 are in each instance preferably of material having a thickness of about 0.05 mm and may be from about 0.025 mm to about 0.25 mm in thickness. Each of the slits 52 and 152 are preferably about 100 mm in length, and may be from about 50 mm to about 150 mm long. The webs 56 between slits 52 and 152 are desirably about 3 mm in width. The circumference of each of the lines of weakness 50 and 150 depends upon the overall size of the rupture discs 22 and 122, but in all instances should extend to at least about one third of the overall distance between the mid-point of margin 46 of segment 44 and the outer periphery of hold-down member 36.

What is claimed is:

1. Non-fragmenting, forward-acting overpressure relief apparatus comprising:

a rupture disc having a central section provided with an overpressure receiving face and a peripheral flange section, said central section of the rupture disc having a bulged portion, said bulged portion of the central section of the disc being of generally asymmetric shape;

said central section of the disc having a line of weakness extending around a part of the central section, said line of weakness having opposed end regions in spaced relationship that define a unitary hinge portion therebetween, each of said end regions having an outermost end, said line of weakness defining a part of the central section of the disc that ruptures and opens upon application of a forward-acting force of at least predetermined magnitude to said overpressure receiving face of the central section, a hold-down member mounted on and engaging the peripheral flange section of the rupture disc on the side thereof opposite the overpressure receiving face of the central section of the disc, said hold-down member having an inner opening in generally circumscribing relationship to the central section of the disc, said hold-down member being provided with a unitary segment that extends into the inner opening of the hold-down member thereof, said segment of the hold-down member overlying and engaging the hinge portion of the disc in disposition overlying said end regions of the line of weakness, said segment having an innermost linear margin extending between opposed end regions of the line of weakness in inwardly spaced relationship from respective outermost ends of the line of weakness, said segment of the hold-down member undergoing deflection in the direction of a forward-acting overpressure force applied to the central section of the disc to absorb and divert a part of the overpressure force away from the portion of the hinge extending between respective outermost end regions of the line of weakness and thereby contribute to prevention of separation of the central section of the disc from the peripheral portion of the disc.

2. Apparatus as set forth in claim 1, wherein said segment of the hold-down member has a generally rectilinear outer margin.

3. Apparatus as set forth in claim 2, wherein said segment of the hold-down member is of generally planar configuration.

4. Apparatus as set forth in claim 1, wherein said central section of the rupture disc is of generally planar configuration.

5. Apparatus as set forth in claim 1, wherein the portion of the central section of the rupture disc between engaged by said segment of the hold-down member is of generally flat configuration.

6. Apparatus as set forth in claim 1, wherein said margin of the hold-down member segment is generally rectilinear and has opposed extremities that overlie and extend beyond opposite respective portions of the line of weakness.

7. Apparatus as set forth in claim 1, wherein a transverse portion of the segment of the hold-down member extending inwardly in a direction away from said margin of the segment is deflected by the hinge portion of the central section of the disc during rupture of the central section of the disc along substantially the full length of the line of weakness, said deflected transverse portion of the segment of the hold-down member absorbing a part of said rupture force applied to the central section of the disc to divert said part of the force away from the part of said hinge portion extending between respective outermost ends of the line of weakness.

8. Apparatus as set forth in claim 7, wherein said deflected transverse portion of the segment of the hold-down member presents a generally inclined outwardly facing surface engaged by the hinge portion of the disc, which in conjunction with the force absorbed by the deflected transverse portion of the hold-down member segment contributed to prevention of separation of the central section of the disc from the peripheral flange section thereof at the hinge portion of the disc.

9. Apparatus as set forth in claim 1, said opposed end regions of the line of weakness converging toward one another and located beneath the hold-down member segment.

10. Apparatus as set forth in claim 1, wherein said line of weakness is defined by a series of elongated, end-to-end, spaced slits extending through the central section of the rupture disc, said slits being separated from one another by individual webs that are unitary with the remainder of the central section of the disc.

11. Apparatus as set forth in claim 10, wherein each of said slits is of substantially greater length than the width of each web between respective ends of adjacent slits.

12. Apparatus as set forth in claim 1, wherein the central section of said rupture disc has an outer edge portion that is generally circular, said hold-down member being of generally annular configuration with the inner opening thereof surrounding the circular edge portion of the central section of the disc.

13. Apparatus as set forth in claim 12, wherein the central section of the disc has a major bulged portion and a unitary minor relatively flat portion, said flat portion of the disc being in engagement with said segment of the hold-down member.

14. Apparatus as set forth in claim 1, wherein the line of weakness in the central section of the disc is configured and sized and the segment of the hold-down member engaging the central section of the disc is oriented with respect to the end regions of the line of weakness such that upon rupture of the central section of the disc along the line of weakness, the hinge portion of the central section of the disc defined by the end regions of the line of weakness bends around the outer margin of the segment of the hold-down member thus precluding separation of said hinge portion and thereby the central section of the disc from the peripheral flange section thereof along an imaginary line between said outermost ends of the end regions of the line of weakness.

15. Apparatus as set forth in claim 10, wherein is provided a pair of said discs, said discs being positioned with one disc overlying the other disc, there being a layer of material therebetween precluding passage of fluid through the slits until rupture of the webs between the slits of each line weakness of respective discs resulting in rupture of the central section of both of the discs.

16. Apparatus as set forth in claim 15, wherein each of the discs is of sheet material, the thickness of the sheet material of one of the discs being greater than the thickness of the material of the other disc.

17. Non-fragmenting, forward-acting overpressure relief apparatus comprising:

a rupture disc having a central section provided with a overpressure receiving face and a peripheral flange section, the central section of the rupture disc having a major bulged portion and a unitary minor relatively flat portion, the central section of the rupture disc having an outer edge portion that is generally semicircular, said central section of the disc having a line of weakness extending around a part of the central section, said line of weakness having opposed end regions in spaced relationship that define a unitary hinge portion therebetween, each of said end regions having an outermost end, said line of weakness defining a part of the central section of the disc that ruptures and opens upon application of a forward-acting force of at least predetermined magnitude said overpressure receiving face of the central section, a generally annular hold-down member mounted on and engaging the peripheral flange section of the rupture disc on the side thereof opposite the overpressure receiving face of the central section of the disc, said hold-down member having an inner opening in generally circumscribing relationship to the semicircular edge portion of the central section of the disc, said hold-down member being provided with a unitary segment that extends into the inner opening of the hold-down member thereof, said segment of the hold-down member being in engagement with said flat portion of the disc, said segment of the hold-down member overlying and engaging the hinge portion of the disc in disposition overlying said end regions of the line of weakness, said segment having an innermost linear margin extending between opposed end regions of the line of weakness in inwardly spaced relationship from respective outermost ends of the line of weakness, said segment of the hold-down member undergoing deflection in the direction of a forward-acting overpressure force applied to the central section of the disc to absorb and divert a part of the overpressure force away from the portion of the hinge extending between respective outermost end regions of the line of weakness and thereby contribute to prevention of separation of the central section of the disc from the peripheral portion of the disc.

18. Apparatus as set forth in claim 17, wherein the part of the bulged portion of the central section of the rupture disc remote from the hinge portion of the disc is of greater three dimensional curvature than the three dimensional curvature of the bulged portion of the central section of the rupture disc that approaches and merges into the flat portion of the central section of the rupture disc.

\* \* \* \* \*